(12) United States Patent
Nassimi

(10) Patent No.: US 8,644,801 B1
(45) Date of Patent: *Feb. 4, 2014

(54) METHODS AND SYSTEMS FOR DYNAMIC TREATMENT OF CALLERS

(71) Applicant: Shary Nassimi, Malibu, CA (US)

(72) Inventor: Shary Nassimi, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/946,820

(22) Filed: Jul. 19, 2013

Related U.S. Application Data

(63) Continuation of application No. 13/790,522, filed on Mar. 8, 2013, now Pat. No. 8,532,627.

(60) Provisional application No. 61/716,135, filed on Oct. 19, 2012.

(51) Int. Cl.
*H04M 3/42* (2006.01)

(52) U.S. Cl.
USPC ....... 455/412.2; 455/567; 455/466; 340/7.28; 379/373.01; 379/201.01; 370/466

(58) Field of Classification Search
USPC ........... 455/412.2, 412.1, 567, 417, 445, 461, 455/466; 340/7.59, 7.28, 7.23, 7.21; 379/204, 207, 373.02, 201.01, 154, 379/229, 220.01, 211.01, 67.01, 212.01, 379/142.01, 88.23; 370/466
See application file for complete search history.

(56) References Cited

U.S. PATENT DOCUMENTS

| | | | |
|---|---|---|---|
| 5,845,219 A | 12/1998 | Henriksson | |
| 6,653,930 B1 | 11/2003 | Bonomo et al. | |
| 6,937,716 B2 | 8/2005 | Lai et al. | |
| 7,142,841 B1 | 11/2006 | Almassy | |
| 7,250,846 B2 * | 7/2007 | Ebling et al. | 340/7.28 |
| 7,606,561 B2 * | 10/2009 | Mathew et al. | 455/412.2 |
| 2004/0255271 A1 * | 12/2004 | Lim | 717/110 |
| 2005/0075096 A1 * | 4/2005 | Aljuraid | 455/414.1 |
| 2005/0096030 A1 * | 5/2005 | Boyd et al. | 455/419 |
| 2005/0286701 A1 * | 12/2005 | Suvanne et al. | 379/207.11 |
| 2006/0121887 A1 | 6/2006 | Chilukoor | |
| 2006/0177030 A1 * | 8/2006 | Rajagopalan et al. | 379/142.07 |
| 2006/0182248 A1 | 8/2006 | Smith et al. | |

FOREIGN PATENT DOCUMENTS

| | | |
|---|---|---|
| KR | 1020050049151 | 5/2005 |
| KR | 100623661 | 9/2006 |
| KR | 1020070047658 | 5/2007 |

* cited by examiner

*Primary Examiner* — Mahendra Patel
(74) *Attorney, Agent, or Firm* — Knobbe, Martens, Olson & Bear LLP

(57) ABSTRACT

Methods and systems for dynamic treatment of callers are described. Optionally, a communication system may include an application installed on a user communication device. The communication system may be utilized to receive and screen calls, enable a user to specify which calling parties may bypass a low indication mode and/or a non-indication mode, challenge callers, and/or identify urgent calls.

15 Claims, 8 Drawing Sheets

METHODS AND SYSTEMS FOR DYNAMIC TREATMENT OF CALLERS

CROSS-REFERENCE TO RELATED APPLICATIONS

This is a continuation of U.S. patent application Ser. No. 13/790,522, filed Mar. 8, 2013, which claims priority from U.S. Patent Application No. 61/716,135, filed Oct. 19, 2012, the content of which is incorporated herein by reference in its entirety.

BACKGROUND OF THE INVENTION

1. Field of the Invention

The present invention is related to call handling, and in particular to methods and systems for dynamic treatment of callers.

2. Description of the Related Art

Conventional cellular mobile telephones have a user-activated silent setting. The silent setting prevents an audible alert, such as a phone ring, from being generated when a phone call is received at the wireless telephone. A user may active the silent setting in order not to disturb others (e.g., in a meeting, movie, concert, etc.) or not to be disturbed (e.g., while sleeping or working). However, when the silent setting is activated it may be difficult or impossible for even urgent callers to reach the user.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain embodiments provide for enhanced call processing on a user communications device, such as a mobile phone. Certain embodiments provide methods and systems for receiving and screening calls, enabling a user to specify which calling parties may bypass a no or low indication mode, enabling callers to indicate the urgency or importance of their call, enabling callers with blocked CallerID to provide identification information, and/or recording voice messages on the communications device.

An example aspect includes a method of processing calls, the method further comprising: receiving an indication that a first call from a caller is being received at a user mobile device associated with a user; determining, via at least one computing system, if the user mobile device is set to a silent mode; determining, via at least one computing system, if the caller is eligible to modify operation of the silent mode; determining, via at least one computing system, whether the user has answered the first call from the caller; at least partly in response to determining that the first user has not answered the first call and that the caller is eligible to modify operation of the silent mode, providing an outgoing message to the caller, the messaging indicating that the caller: can leave a voice message for the user, or provide an entry to notify the user that the first call is an important call; and determining whether the caller provided the entry to notify the user that the first call is an important call or whether the caller is leaving a voice message for the user, at least partly in response to determining, via at least one computing system, that the caller did not provide the entry to notify the user that the first call is an important call, and that the caller is leaving a voice message for the user, recording the caller voice message on the user mobile device, at least partly in response to determining that the caller provided the entry to notify the user that the first call is an important call within a predetermined amount of time, causing, at least in part, the user mobile device to provide a user cognizable alert.

An example aspect provides method of processing calls, the method further comprising: while a mobile device of a user is engaged on a first call from a first caller, receiving, at at least one computer system, an indication that a second call from a second caller is being received; determining, by at least one computer system, whether the user mobile device is set to a mode configured to prevent a call waiting alert from being provided with respect to calls from callers that have not been designated by the user as eligible to have a call waiting alert generated when a first condition is present; determining, by at least one computer system, whether the second caller has been designated as eligible by the user to have the call waiting alert generated when the first condition is present; at least partly in response to determining that the second caller is eligible to have the call waiting alert generated when the first condition is present, causing, at least in part, a call waiting alert to be provided to the user, at least partly in response to determining that the second caller is not eligible to have the call waiting alert generated when the first condition is present, inhibiting the call waiting alert from being provided to the user.

Optionally, after determining that the second caller has been designated as eligible to have the call waiting alert generated when the first condition is present and causing, at least in part, the call waiting alert to be provided to the user, determining whether the user answered the second call, and at least partly in response to determining that the user did not answer the second call, transmitting a text message to the second caller instructing the second caller to provide a first response to the text message if the second call is important, and determining whether the second caller provided the first response, and at least partly in response to determining that the second caller provided the first response to the text message, providing an important call alert to the user via the user mobile device, and facilitating a call initiation from the user mobile device to the second caller. Optionally, the first condition is a silent mode condition.

An example aspect provides a method of processing calls, the method further comprising: receiving at a computer system a call from a caller; determining whether there are multiple users that have designated the caller as eligible to modify a silent setting on respective users' communication devices, at least partly in response to determining that there are multiple users that designated the caller as eligible to modify the silent setting on respective users' communication devices, prompting the caller to indicate which of the multiple users that the caller is attempting to contact; receiving a caller selection of a user in the multiple users that designated the caller as eligible to modify the silent setting on respective users' communication devices; prompting the caller to indicate whether the call is an important call; determining whether the caller indicated that the call is an important call, and at least partly in response to determining that the caller indicated that the call is an important call, causing, at least in part, the call to ring through to a communication device of the selected user and providing, in association, an important call indicator to the selected user.

An example aspect provides a computer system comprising: one or more hardware processors in communication with a computer readable medium storing software modules including instructions that are executable by the one or more hardware processors, the software modules including at least: a module configured to receive an indication that a first call from a caller is being received at a user mobile device associated with a user; a mode detection module configured to determine if the user mobile device is set to a silent mode; an eligibility detection module configured to determine if the caller is eligible to modify operation of the silent mode; a call processing module configured to: determine whether the user has answered the first call from the caller, and at least partly in response to determining that the first user has not answered the first call and that the caller is eligible to modify operation of the silent mode, provide an outgoing message to the caller, the messaging indicating that the caller: can leave a voice message for the user, or provide an entry to notify the user that the first call is an important call; and determine whether the caller provided the entry to notify the user that the first call is an important call or whether the caller is leaving a voice message for the user, at least partly in response to determining that the caller did not provide the entry to notify the user that the first call is an important call, and that the caller is leaving a voice message for the user, record the caller voice message on the user mobile device, at least partly in response to determining that the caller provided the entry to notify the user that the first call is an important call within a predetermined amount of time, cause, at least in part, the user mobile device to provide a user cognizable alert.

BRIEF DESCRIPTION OF THE DRAWINGS

Embodiments will now be described with reference to the drawings summarized below. These drawings and the associated description are provided to illustrate example embodiments, and not to limit the scope of the invention.

DETAILED DESCRIPTION OF PREFERRED EMBODIMENTS

Figure 1:
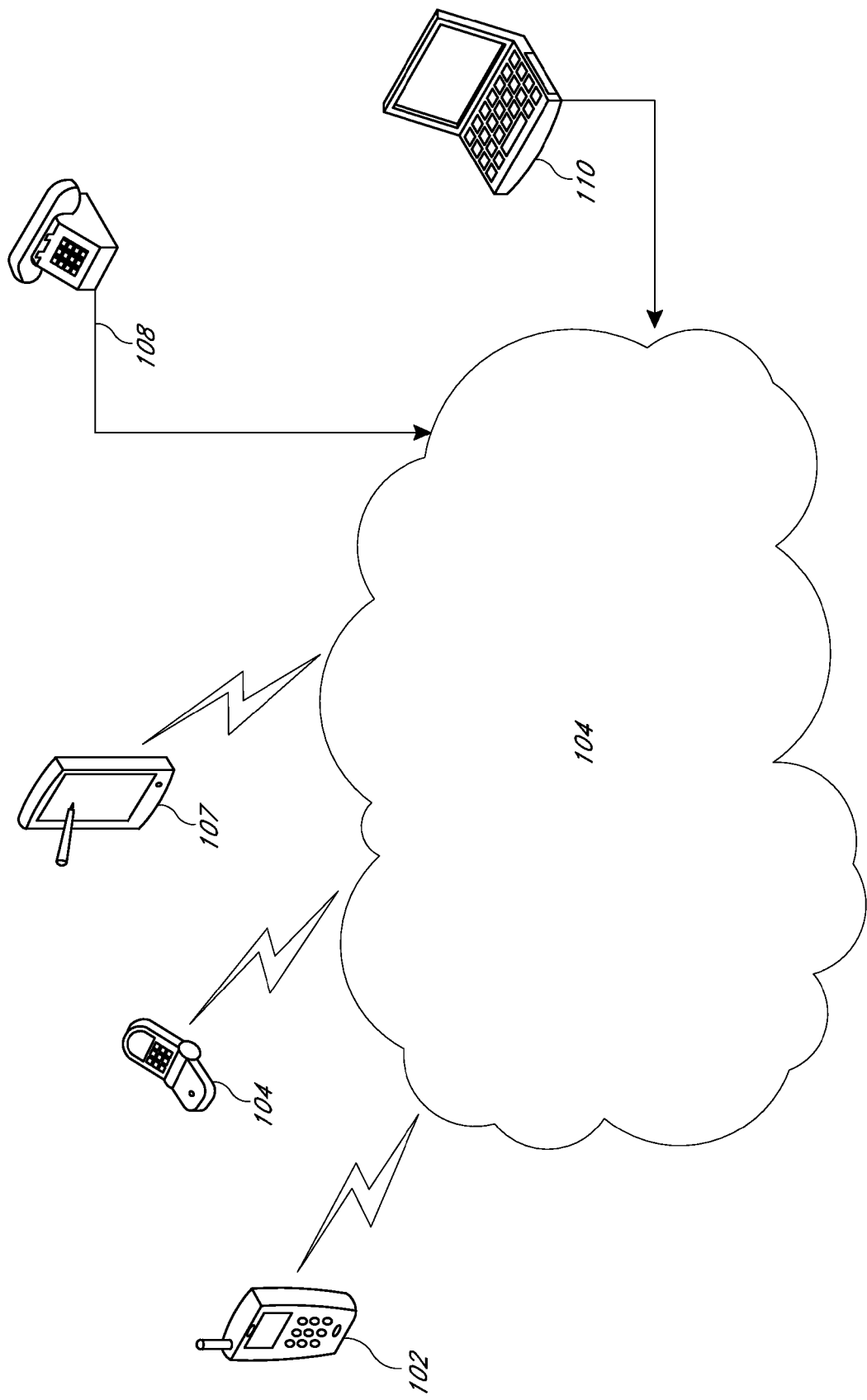
FIG. 1 illustrates an example environment in which certain systems and processes described herein may be used.
Figure 2:
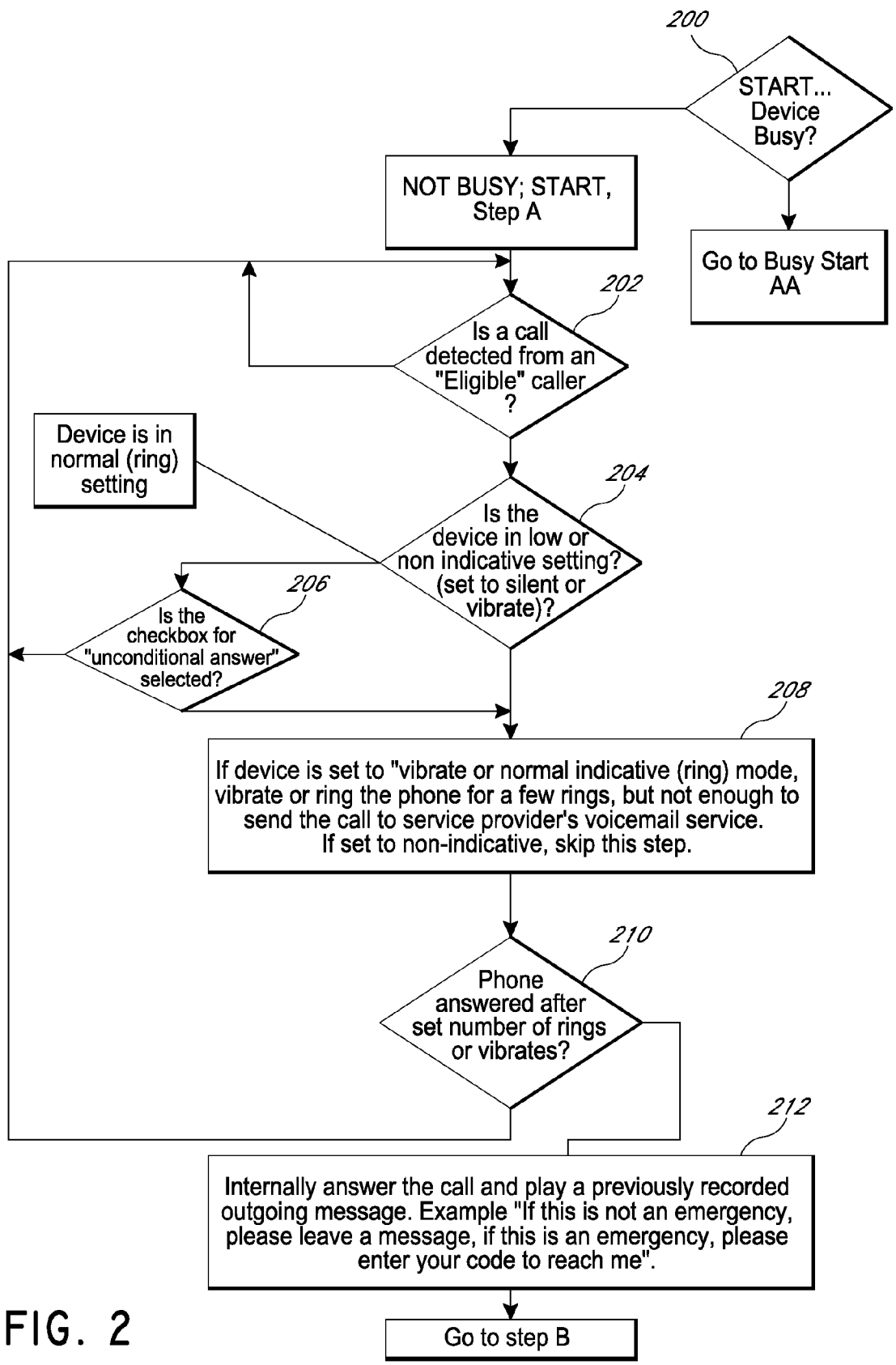
FIGS. 2-8 illustrate example processes.

Systems and methods for bypassing a low-indicative or non-indicative state on a user device, such as a wireless telephone, are provided. For example, when in a low-indicative state, the telephone's audible ringing/call alert sound is disabled with respect to incoming calls (although the telephone may vibrate in response to incoming calls). By way of further example, in a non-indicative state, both the ringing/call alert sound and the call vibration alerts may be disabled. The term "silent setting" as used herein is intended to encompass both low-indicative and non-indicative states, unless the context indicates otherwise. While use of the silent setting prevents a disturbing ringing sound from being emitted when a call comes in, disadvantageously, it prevents the user from receiving an audible alert for incoming emergency calls, or calls from specified callers that the user wants to receive an audible alert for even while the user's phone is in silent setting. Certain embodiments described herein enable a user to receive an audible alert for calls from user-specified callers and/or for user specified call statuses (e.g., calls with an emergency status).

As described in greater detail herein, in certain embodiments an application (sometimes referred to as an "app"), may be downloaded by a user to the user's phone over a wired or wireless network or may be installed on the phone prior to distribution to the user. The phone may be a mobile cellular smart phone having a display and a user input device (e.g., a touch screen and/or physical controls), or the phone may be another type of device providing a telephonic function (e.g., a tablet, desktop, or laptop computer equipped with a microphone and speaker, and a phone or VoIP network interface). As described below, the application enables the user's phone to perform many call processing functions that would otherwise need to be performed by a wireless carrier's call processing, call routing, and voice mail systems. Thus, certain embodiments offload computational, call routing, and data storage loads from carrier systems and distribute such loads to user phones, enabling the carrier system to be more responsive and require less resources.

In an example embodiment, the user may specify, via a user interface presented or modified by the app, which of the user's contacts are to be enabled to bypass the silent setting. For example, a data field, such as a "checkbox," may be added to a contact record user interface in order to enable the user to identify eligibility of the contact to penetrate an indicative setting (e.g., a low-indicative setting/non-indicative setting) of the phone. Optionally, another data field maybe added to the contact record user interface enabling the user to assign one or more access "codes" to the contact, which may be provided by the user and/or the application to the contact, and which may be utilized by the contact when calling or contacting the user to indicate that the contact's communication is urgent (or otherwise important). For example, the code may be a single character or multi-character code (e.g., "1", "123", "MomUrgent", etc.). The application may be configured to recognize such code when provided by the contact during a call.

In certain embodiments, when a call is received from a calling party while the phone is in a silent setting, the application determines whether the calling party has been authorized by the user to bypass the silent setting. For example, the application may examine CallerID information received with the call's call signaling information (which may include the caller's phone address, which may be a conventional phone number), and compare the CallerID information with the telephone addresses included in the user's contact records. The user's contact records may be stored on the user's phone (which may include a user removable memory device) and/or on a remote server (e.g., a service provider's server).

If a matching record is found, the application determines whether the contact record indicates whether the calling party is eligible to bypass the silent setting. If the calling party is not eligible to bypass the phone's silent setting, then the phone does not audibly sound to alert the user of the call (other than whatever minor sound may be emitted as a result of a phone vibration if the phone is in a vibrate mode) and the call may be answered by the conventional phone carrier answering system or an answering service provided by the user's phone (e.g., by the application). The answering system may play an outgoing message to the calling party asking the call party to leave a message. The outgoing message may be a default outgoing message or may be prerecorded by the user. The message recorded by the calling party may later be played back by the user via the user's phone. If, instead, the calling party is identified as eligible to bypass the phone's silent setting, then the application enables the phone to audibly alert the user of the incoming call (and optionally vibrate the phone if the user has previously setup the application to do so), optionally with a specifically assigned or user selected urgent alert tone.

Optionally, even if the calling party is eligible to bypass the silent setting, rather than immediately enabling the user's phone to emit an audible call alert, the application prompts the calling party to indicate the nature of the call. For example, the application may answer the call. Optionally, the application answers the call without the user knowing or being informed that the call has been answered. Optionally instead, the user is notified by the application that the application has answered the call with a visual icon or text presented on the user phone indicating that urgent call screening is being performed. Optionally, the user's cellular service provider is not aware that the call has been automatically answered by the application (rather than by the user).

After the application answers the call, the application asks (e.g., using a built-in default outgoing message or a user recorded outgoing message) the calling party to indicate whether the call is urgent or not (e.g., by entering a code, pressing a specified phone key(s), providing a verbal indication, etc.). If the eligible calling party indicates that the call is urgent, the call bypasses the silent setting and an audible and/or visual alert may be provided. In addition, a vibration alert may be provided. If the eligible calling party indicates that the call is not urgent, the call may be answered by the application which acts as an answering machine and records a message from the calling party. The message may be stored on the user's phone (which may include a user removable memory device) for later playback by the user. The application may also cause the message to be stored on a remote server for playback via the phone or another device (e.g., a tablet, laptop, or desktop computer). Thus, in an optional embodiment, the application answers the eligible caller's call when the phone is in a silent setting, whether or not the silent setting is bypassed.

In certain embodiments, rather than comparing the calling party's CallerID with the user's contact database to determine whether or not the caller is eligible to bypass a silent setting, when the application determines that the phone is in a silent setting, it answers each caller's call (optionally without the user even knowing or being alerted that the call has been answered or optionally with a visual icon or text presented on the user phone indicating that urgent call screening is being performed), and prompts each caller to enter a silent setting bypass code. If the calling party enters a code (e.g., pressing a specified phone key(s), speaking the code, etc.), the application determines from the code whether the code is the correct code for bypassing the silent setting (e.g., by comparing the entered code with a database of one or more eligibility codes stored on the user's phone).

If the code is a correct code, the call bypasses the silent setting and the phone provides a user-cognizable indication beyond the indication provided by the phone in a silent setting, such as a ringing or other audible, visual or tactile alert (optionally, even if the code is a correct code, the calling party may be prompted to indicate whether the call is urgent or not, as similarly described above). If the code is not an eligible code, optionally the application acts as an answering machine and records a message from the calling party which may be stored on the user's phone for later playback. Optionally, a control may be provided via which the user can instruct the application to transmit the voice message to a specified destination (e.g., to a specified email address, MMS address, or otherwise). The application will then cause the voice mail and/or a link to the voice mail to be transmitted to the specified destination so that it may be played back by the recipient associated with the specified destination.

In certain embodiments, if an eligible caller calls the user's phone while the user is on another call, the application may determine the caller's communication device's phone address (e.g., from the call signaling information or contact record), and automatically transmit a message (e.g., an SMS text message, an MMS message, or other message type) from the user's phone to the calling party's communication device (e.g., using the phone address to address the text message) challenging the eligible calling party to reply to the text with an indication as to the urgency of the call. For example, the message may recite "please respond to this text message with a "1" if the call is urgent." If the caller then responds to the message with a "1", the application (and/or the user's phone's built in texting application) causes a user cognizable indication to be provided to the user indicating that the caller needs to urgently speak with the user (e.g., via a displayed text message, icon, audible urgent call alert, and/or other indicator) while the user is on the other call. For example, the notification may state that "[Name] is trying to urgently call you". The application may determine the caller's name by matching the CallerID information obtained from the call signaling information with a contact record, and user the name in the contact record as the caller's name.

Certain embodiments enable the user's phone to automatically answer calls even when in normal indicative/non-silent setting. In certain embodiments, if the user's phone is in a normal indicative setting (such as in a ring setting where audible alerts are provided from incoming calls), and a call is received from an eligible contact, if the application determines that the user has not answered the phone within a pre-determined number of rings and/or within a predetermined amount of time, the application answers the call (thereby preventing the user's phone service provider's voicemail system from answering the call). The application may ask the calling party to indicate whether the call is urgent or not (e.g., by entering a code previously assigned and communicated to the contact, pressing a specified phone key(s), providing a verbal indication, etc.).

If the eligible calling party indicates the call is urgent, the application may cause the user's phone to generate a uniquely identifiable "urgent" audible alert/ring, an urgent visual alert (e.g., an urgent icon and/or text), and/or an urgent vibration alert (e.g., a stronger than normal vibration or an urgent vibration pattern), in order to alert the user of the urgency of the call. The application may also increase the volume of the alert to better attract the user's attention. If the user fails to answer the call within a certain period of time or after a certain number of rings, the application may prompt the calling party to record a message for later retrieval and playback by the user. The application may then cause the phone to display a message indicating that an urgent message has been recorded and/or cause the phone to periodically emit an audible alert indicating that an urgent message has been recorded.

In certain embodiments, the user may setup the application, by selecting a corresponding option presented by the application or otherwise, so that the application will specially handle incoming calls with a blocked CallerID. When such option is selected, the application determines from call signaling information whether an incoming call has been marked private or that the calling party's CallerID is otherwise blocked.

If the application determines that the incoming call has been marked private or that the calling party's CallerID is otherwise blocked, the application answers the call before the call can be forwarded to the telecom service provider's voicemail system. The application may play a prompt to the calling party (which may have been recorded by the user or pre-installed by the phone or application provider), challenging the calling party to indicate the calling party's identity by entering (via a DTMF key press, via voice, or otherwise) a code or a phone address assigned to or otherwise associated with the calling party. If the calling party provides the code or phone address, the application determines if the code is valid or if the phone address corresponds to an eligible party as indicated in the user's contact database. For example, the application may compare the entered code with one or more eligibility codes stored in the user's contact database (or by similarly comparing the calling party's phone address with those in the user's contact database). If a match is found, the application may verbally prompt the calling party to indicate the urgency of the call. If the application determines that the calling party has indicated that the call is urgent (e.g., via a key entry or voice response by the calling party), the application causes the user's phone to provide a user cognizable urgent indication to alert the owner of the urgent call (e.g., by displaying a text message on the user's phone display or by playing a ringtone or voice indicating that the call is urgent).

Optionally, the application may provide the user with status information of a call handling process. For example, the application may visually (e.g., using icons or bar graph) and/or textually indicate when the application has answered a call, when the application is challenging a caller with blocked CallerID, when the application is prompting the caller to enter an eligibility code, when the application has received an eligibility code, when the application has verified (or failed to verify) the eligibility code, when the application has requested that the caller to indicate that the call is urgent, when the caller has indicated whether or not the call is urgent, etc. The user may have the option to take the call at any point in the call processing by activating a "take the call" control presented by the application or by activating the phone's native call answering control. For example, once the application has determined that the caller is an eligible caller, the user may decide to take the call prior the application prompting the caller to indicate whether the call is urgent.

Thus, certain embodiments may include some or all of the following features, or any combination thereof:

The ability for the user to designate one or more contacts as "eligible" to reach the user under certain circumstances (e.g., in an emergency or other urgent situation), even when other, non-eligible, callers may not be able to reach the user (e.g., when the user's phone is in a silent setting or other low or non-indicative mode, when the user is already on another call, etc.).

Techniques that detect incoming calls and determine whether the caller is an "eligible" caller (e.g., by determining if the caller has been designated as "eligible" by the user).

Call processing techniques for challenging callers (e.g., via a default or user recorded outgoing voice message) to provide an indication regarding the nature of the call (e.g., that the call is urgent) and/or that the caller is an eligible caller.

Call processing techniques for notifying callers (e.g., via a secondary outgoing voice message or tone) to indicate that the called party is not available to receive a call designated as urgent, and for enabling the caller to record a message, with an urgent indication being provided to the user.

Techniques for overcoming low or non-indicative modes on the user's phone and for providing a user cognizable visual, audible, and/or vibration indication to alert the user of the nature of the call.

Techniques for providing a user cognizable visual, audible, and/or vibration indication to alert the user of the nature of the call when the user phone is in normal indicative mode.

Techniques for generating an urgent tone, if the user is already communicating on the user phone.

Techniques for receiving and storing incoming voicemail on the user phone (without requiring that the voice message be first recorded by a remote call answering system).

Techniques for notifying the user of an urgent voicemail using audible and/or visual urgent voice message alerts which may be continuously or periodically presented.

Techniques for detecting, using the user phone application, urgent calls from contacts designated as "eligible" when the user is on a call with another party using the user phone, by transmitting a message, such as a text message, to the caller, challenging the caller, and based at least in part on the caller reply, providing the user with a notification of the reply while the user is on the call with another party.

Techniques for detecting private or blocked ID calls and challenging the caller to provide a response in order to determine if the caller is a predetermined "eligible" caller, and if so, challenging the caller regarding the nature of the call.

The user may be instructed by the application to record various outgoing messages to be selectively played to callers based on the call scenario and/or the caller's status as an eligible caller as described elsewhere herein (although optionally, the application may playback canned, prerecorded genetic messages included with the application or provided by the application provider). Following are some example outgoing messages, although other messages may be used:

"Please indicate if you need to reach me urgently by entering your urgent code".

"Please leave me a message".

"I know you need to reach me urgently, but I'm not available to answer your call at this time. Please leave an urgent message".

Optionally, if there is more than one person associated with the remote system phone address (such as three family members that have respective communication devices with the application installed thereon and each has indicated that the caller is "eligible"), then the server may prompt the caller to indicate which user the caller is trying to contact. For example, the prompt may be in the form of:

"If you are trying to contact Jim Doe, press "1", if you are trying to contact Joan Doe, press "2", and if you are trying to contact Robin Doe, please press "3".

As similarly discussed elsewhere herein, for a given scenario, the application, when executed by the phone, may cause the phone to perform some or all of the following operations:

Automatically answer a call, optionally without the user being aware that the call is being answered, to ask a caller determined to be eligible to indicate the urgency of the call, and then detect whether the caller indicated the call is urgent or not.

Automatically answer a call, optionally while visually indicating (e.g., via text and/or graphics) that the application is processing a potentially urgent call, thereby enabling the user to answer the call without the caller having to indicate the call urgency.

Automatically transmit a data message to caller device, requesting the caller to indicate the urgency of the call, and then detect whether the caller indicated the call is urgent or not in a reply data message.

Generate an audible alert (e.g., a ring back tone) for the caller, so that the caller is aware that the phone is attempting to get the attention of the device owner.

Bypass silent settings and attempt to get the attention of the called party (e.g., using sound, vibration and/or a visual indication).

Record on the phone a voice mail message from the caller if the call is not urgent and store the message on the phone.

Record on the phone a voice mail message from the caller, even if the caller indicated that the call is urgent, if the user does not answer the call within a certain threshold (e.g., within a certain number of rings or within a certain period of time), and provide a user cognizable indication (e.g., using sound, vibration and/or a visual indication) in order to indicate to the user that the user missed an urgent call and/or that an urgent message has been recorded for the user.

Thus, certain embodiments provide methods and systems for receiving and screening calls, enabling a user to specify which calling parties may bypass a low indication mode and/or a non-indication mode, challenging callers, and/or identifying urgent calls.

A non-limiting example scenario will now be described. A user may place her mobile phone in "silent setting" (non-indicative mode), in order to sleep and to avoid being woken by unimportant calls, which may wake her if the phone rings or vibrates to announce such calls. However, the user may desire to receive urgent calls from her elderly parents in case of an emergency. Therefore, the user has designated her parents as eligible to override a silent setting on her phone by selecting a designated checkbox (or other like user interface) in a contact record for her parents. The user or application may also specify a silent setting override code, to be entered by her parents when placing an urgent call while the phone is in silent setting. For example, the code may be "1". The user may have also has prerecorded an outgoing message stored in the mobile phone, stating "Hi, if you've reached this message, my phone's ringer is turned off. If you have an emergency, press 1. If not an emergency, please record a message".

As the user sleeps, her parents call, the mobile phone plays the outgoing message, and since, in this instance, the call is not an emergency call, the parents leave a message, which is stored on the mobile phone, and is later retrieved by the user.

On another night, when the user has placed the mobile phone in the silent setting, the parents need to urgently speak with the user. After hearing the outgoing message, the parents enter a "1" by pressing on a soft or hard "1" key on the parent's phone or by speaking the number "1". At least partly in response, the application causes the user's mobile phone to ring, waking and alerting the user of the urgent call and enabling her to answer the urgent call.

Optionally, in certain embodiments, if there is an urgent call (as indicated by the caller) and the user misses or does not take the urgent call, the application stops ringing the user's phone and/or stops providing a visual "ringing" indication after a predetermined amount of time or after a predetermined number of rings (optionally configurable by the user). However, the application may continue to intermittently (e.g., every 5 minutes, every 10 minutes, once an hour, or other time period, optionally configurable by the user) provide audible and/or visual indications regarding the missed urgent call for a predetermined amount of time (optionally configurable by the user) or for an indefinite amount of time, until the user instructs the application to halt the indication and/or unless the user returns the call.

Certain embodiments will now be described in greater detail.

Referring to FIG. 1, and illustrative environment is illustrated. A user's communication device 102 (which in this example is a mobile cellular phone) includes an application including some or all of the features described herein. The communication device 102 may receive over network 104 (which may include a wireless cellular network, a PSTN (public switched telephone network) network, and/or and IP network, or other network) calls from other wireless phones 106, 107, wireline POTs (plain old telephone service) phones 108, VoIP (Voice over Internet Protocol) phones 110, and/or other phone types. The communication device 102 in conjunction with the application may perform some or all of the processes described herein.

FIGS. 2-5 illustrate an example call handling process which may be executed by an application hosted on a user phone device. At state 200, an incoming call is detected, and a determination is made as to whether the user is already engaged in a voice call via the user phone and/or if the CallerID of the incoming call is blocked. If the user is not already engaged in a voice call via the user phone and optionally if the CallerID is not blocked, the process proceeds to state 202. A determination is made as to whether the call is from an eligible caller. For example, as described elsewhere herein, the determination may optionally be made by comparing call signaling information (e.g., CallerID information) and/or a user entered code with those in the user's contact database to determine if there is a match with a contact who the user has specified is eligible to bypass a silent setting (e.g., non or low indicative setting). If the process determines that the caller is an eligible caller, the process proceeds to state 204 and a determination is made as to whether the device is in a low or non-indicative setting (e.g., a vibrate setting or a silent setting with no vibration). At state 206, if it is determined that the phone is in a normal (e.g., ring) setting, a determination is made as to whether the user has previously selected an unconditional answer option, indicating that the application is to answer the call regardless of the phone indicative setting.

At state 208, if it is determined that the phone is set to a vibrate or normal indication (e.g., ring) mode (but not to a totally a silent setting with no vibration or ringing), or that the user has selected the unconditional answer mode, the application enables the phone to ring and/or vibrate a set number of times or for a certain time period. At state 210, a determination is made as to whether the user has answered the call within the set number of times or for the certain time period. If the call is answered, the process ends. Otherwise, the process proceeds to state 212. The call is answered and a prerecorded outgoing message is played to the caller asking the caller to leave a message or, if the call is urgent, to enter a code in order to reach the user.

Figure 3:
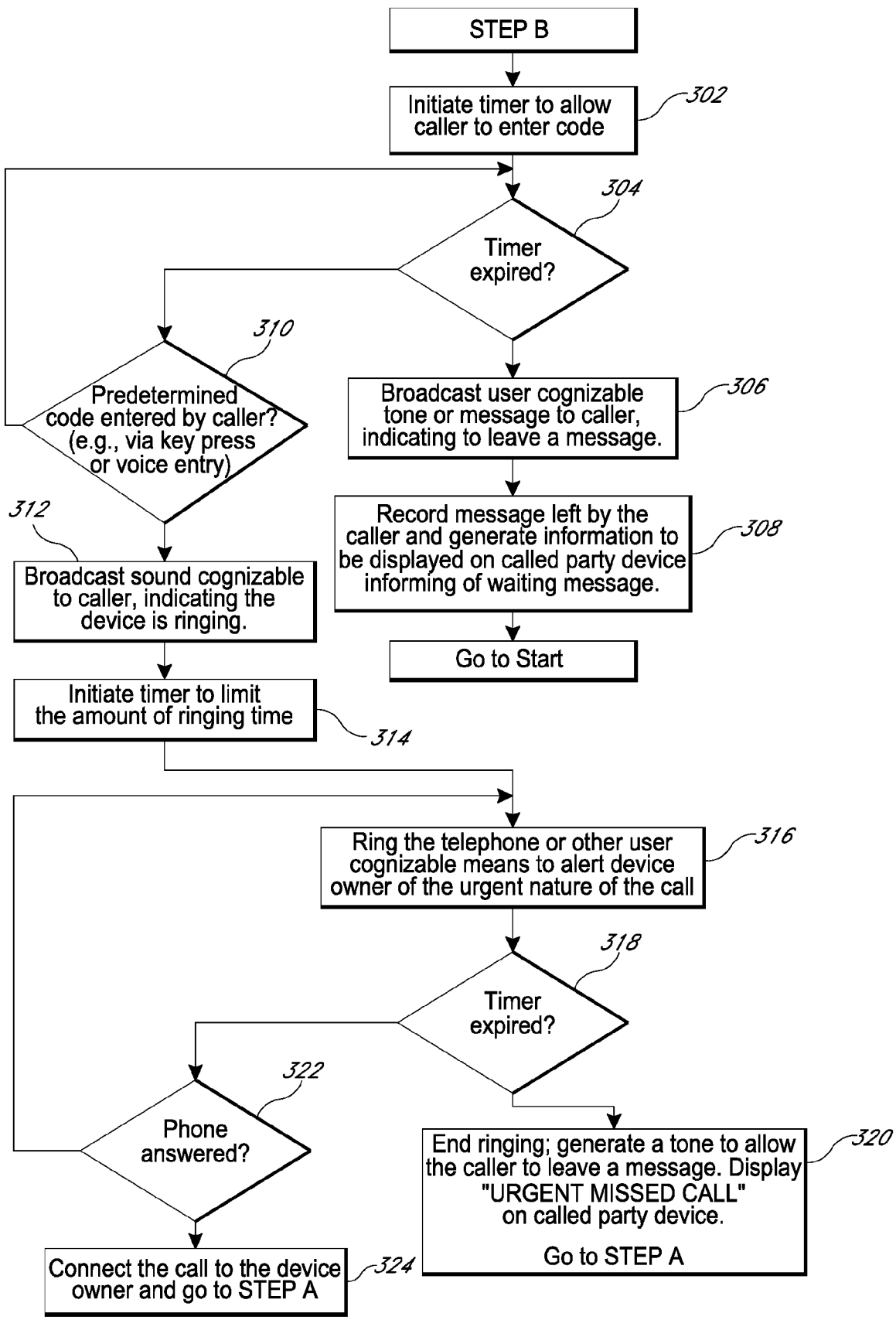

Referring to FIG. 3, the process proceeds to state 302, and a timer is initiated to provide the caller a certain period of time to enter the code. At state 304, a determination is made from the timer as to whether the period of time has expired. If the period of time has expired without the caller entering a code (or optionally without the caller entering a valid code), the process proceeds to state 306. The caller is prompted (e.g., by a tone and/or an outgoing voice message) to record a message for the user. The caller message may be recorded and stored on the user phone. The user may then later retrieve and playback the recorded caller message.

If, at state 310, a determination is made that the caller has entered a valid code, the process proceeds to state 312. A sound is played to the caller (e.g., a ring back audible tone or other alert) indicating that the call is ringing through on the user phone. At state 314, a timer is initiated limiting how long the call is to ring (where the term "ring" may include alerts other than a literal ringing sound, such as a snippet of music) on the user phone. At state 316, a user cognizable alert is provided by the phone (e.g., using sound, vibration and/or a visual indication) indicating the critical nature of the call. For example, the user may have preselected a ring tone to be used by the application to indicate an urgent call (e.g., a siren sound, or the phrase "urgent call"). At state 318, a determination is made as to whether the timer has expired. If the timer has expired and the user has not answered the phone, the user phone ringing is terminated, and the caller is prompted (e.g., via an outgoing voice message and/or a tone) to record a message. The caller message may be recorded and stored on the user phone. An urgent message notification alert may be provided to the user (e.g., using sound, vibration and/or a visual indication). For example, the phone may display the message "Urgent Message." The user may then later retrieve and playback the recorded caller message. The process then proceed back to state A.

Prior to the timer set at state 314 expiring, a determination is made at state 322 as to whether the call has been answered. If the call is answered, the process proceeds to state 324, and the user may converse with the caller. The process may then proceed to state A.

Figure 4:
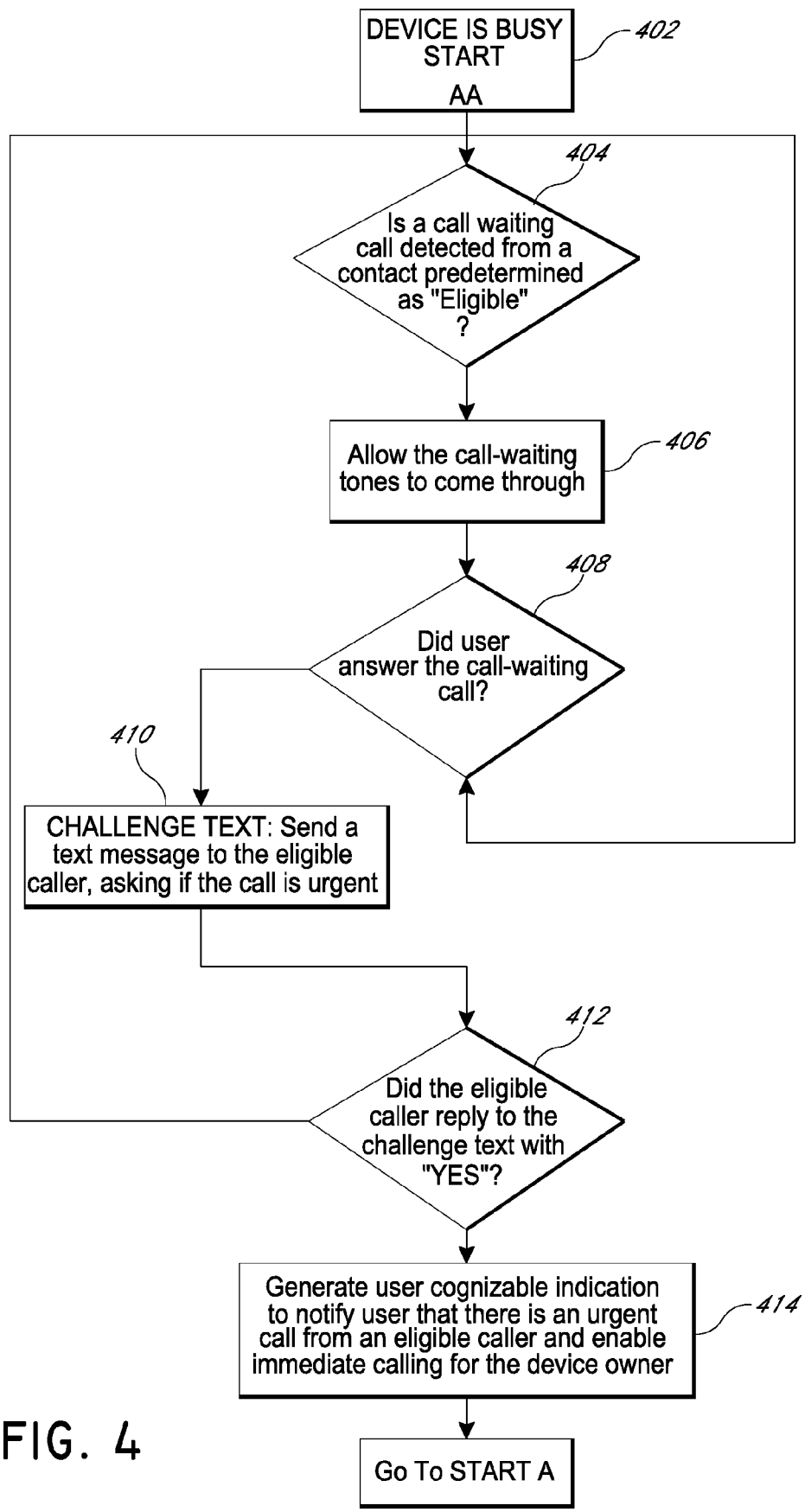

Referring to FIG. 4, if, at state 200, the process determines that the user is already engaged in a voice call via the user phone when another call comes in, the process proceeds to state 402. Optionally, a determination is made as to whether the user had previously selected a call waiting challenge option. If the user has not selected the call waiting challenge option, optionally the process exits. If the user has selected the call waiting challenge option, the process proceeds to state 404.

At state 404, if not already performed, a determination is made as to whether the call is from an eligible caller. For example, as described elsewhere herein, the determination may optionally be made by comparing call signaling information (e.g., CallerID information) and/or a user entered code with those in the user's contact database to determine if there is a match with a contact who the user has specified is eligible to bypass a silent setting (e.g., non or low indicative setting). At state 406, the process enables call waiting tones to be played to the user (which may be the conventional call waiting tones). At state 408, a determination is made as to whether the user answered the call-waiting call within a predetermined number of rings or time period. If the user did not answer the call-waiting call within the predetermined number of rings or time period, the process proceeds to state 410. A challenge message is transmitted by the application (e.g., as an SMS or MMS message) to the caller's phone asking the caller if the call is urgent. At state 412, a determination is made as to whether the caller responded to the message (e.g., via an SMS or MMS message) with an indication that the call is urgent. If the caller to respond with an indication that the call is urgent, the process proceeds to state 414, and the application generates a user cognizable visual, audible, and/or vibration indication that there is an urgent call from an eligible caller even if the user is still on the other call. The user may then take the call waiting call or activate a return call control which causes the user's phone to call the caller's phone. The process then optionally returns to state A. A similar process can be performed if a contact transmits an urgent text message to the user's phone.

For example, if the user is on a call and a text message is received from a sender, the application may determine, from the sender's sending device address (e.g., the sender's wireless phone's phone address transmitted to the user's phone in association with the text message) and/or from a code included in the text message, if the sender is an eligible contact, as similarly described above. Optionally, the application determines whether the text message includes one or more words indicating the urgency of the text message. For example, the application may maintain a database of key words relating to the urgency of a message, such as the words "urgent", "as soon as possible," "ASAP", "emergency", "!!!!!", etc. The application may parse the text message to determine whether one or more words in the text message corresponds to a word in the key word database, and if so, identify the text message as potentially urgent. Optionally, the user may be able to add or delete words from the key word database.

At least partly in response to determining that the text message is potentially urgent, the application may automatically transmit a "challenge" text message to the eligible contact, asking the contact if the text message is urgent and/or if the contact wants to interrupt the user's current voice call with an urgent notification (e.g., an urgent ring tone and/or vibration). If the contact responds with a "yes" indication, the application causes the user phone to provide the urgent alert notification, even though the user may still be on the call. If the contact replies with a "no" indication or does not reply at all, then the application does not cause the user phone provide the urgent alert notification. Optionally, the user may specify for one or more eligible contacts that the challenge message should be sent to the selected eligible contacts (or all eligible contacts) in response to an eligible contact text message, even if the contact's text message does not indicate that the message is urgent. Optionally, the user may specify that the challenge message should be sent to all text message senders, even if they have not been specified by the user as an eligible contact.

Figure 5:
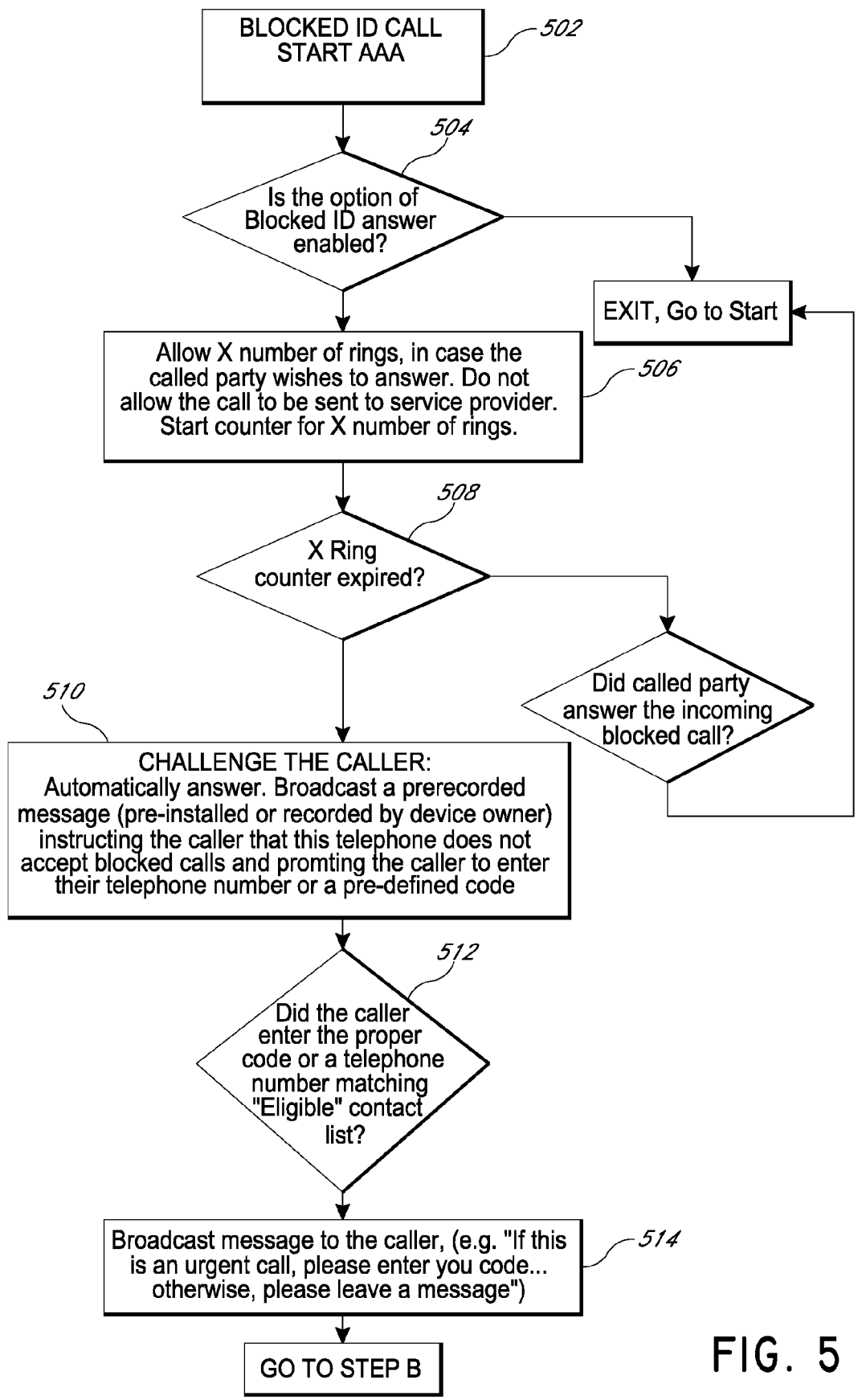

If, at state 200, a determination is made that the CallerID of the incoming call is blocked (which would prevent the caller's name or phone address from being displayed or otherwise provided to the user from the call's call signaling information), the process may proceed to state 502, illustrated in FIG. 5. At state 504, a determination is made as to whether the user had previously selected a CallerID blocked answer option. If the has not selected the CallerID blocked answer option, the process exits. If the user has selected the CallerID blocked answer option, the process proceeds to state 506. At state 506, the application waits a predetermined number of rings or a predetermined period of time to enable the user to answer the call (even though the CallerID is blocked). The application may actually answer the call, but continue playing a ring tone so that the caller is not aware the application has answered the call and to prevent the call from being forwarded to the service provider's call answering service.

At state 508, a determination is made as to whether the predetermined number of rings or time period has expired. If the user has answered the call, the process exits. If an expiration event has occurred and the user has not answered the call, the process proceeds to state 510. The application notifies (e.g., via an outgoing voice message) the caller that the telephone does not accept blocked calls and prompt the caller to manually enter the caller's telephone address or an eligibility code. At state 512, a determination is made as to whether the caller entered the caller's telephone address or eligibility code. If the caller has entered the caller's telephone address or eligibility code, the process proceeds to state 514, and the caller is prompted to indicate whether the call is urgent. If the caller indicates the call is urgent, the process proceeds to State B, and the application may generate a user cognizable visual, audible, and/or vibration indication that there is an urgent call from an eligible caller. The user may then take the call or not answer the call. If the user does not answer the call within a predetermined amount of time or rings, the application prompts the caller to record a voice message, which is recorded and stored on the user phone for later playback.

In certain embodiments, when a microphone is muted, the operating system of the user's communication device may not permit the application to transmit voice or other sound data (e.g., a pre-recorded prompt from the application) from the communication device to a caller's communication device. Thus, the application may be prevented from playing audible greetings, prompts or challenges to the caller.

Certain embodiments overcome or address this technical issue as follows. Rather than the application installed on the user's communication device playing audible messages to a caller, such as outgoing voice messages/prompts, a remote system may play such messages and prompts to a caller. In particular, a user may be provided or assigned a telephone address, such as a telephone number, which is associated with the remote system. The user may provide such phone address to potential callers (e.g., the user's family, friends, and business associates, etc.). The user may indicate which callers are to be treated as "eligible" callers as similarly described above. The phone addresses and names of the eligible callers may be uploaded from the application/user's communication device to a data store (e.g., database) of the remote system. If the user adds or deletes "eligible" caller designations, the application may upload such changes to the remote system, which can record the changes in the remote system data store to thereby synchronize the eligibility designations of the remote system with those of the communication device application.

When a caller calls the phone address associated with the remote system, the call terminates on the remote system. The remote system may access caller identification information (e.g., the caller's phone address) from the call signaling information (e.g., from the Caller ID field). The remote system compares the call signaling information with the phone addresses in the database to determine if the call is from an eligible caller. If the call is from an eligible caller, the remote system answers the call and plays an appropriate outgoing message/challenge, as similarly described above. For example, the remote system may play one of the following messages:

"Please indicate if you need to reach me urgently by entering your urgent code".

"Please leave me a message".

"I know you need to reach me urgently, but I'm not available to answer your call at this time. Please leave an urgent message".

"Please indicate if you need to reach me urgently by entering your urgent code," otherwise, please record a message at the tone.

Optionally, if there is more than one person is associated with the remote system phone address (such as three family members that have respective communication devices with the application installed thereon), then the server may prompt the caller to indicate which user they are trying to contact. For example, the prompt may be in the form of:

"If you are trying to contact Jim Doe, press "1", if you are trying to contact Joan Doe, press "2", and if you are trying to contact Robin Doe, please press "3".

If the caller is determined to be an eligible caller and the caller indicates that the call is urgent, the remote system may call the user's communication device, including the caller's identification information (e.g., caller ID) in the call signaling information or otherwise, optionally, along with the a special character, such as an additional alphanumeric character. The application installed on the user's communication device recognizes from the special character that the call is urgent, and audibly, visually, and or via vibration notifies the user, as similarly discussed above, that the call is an urgent call.

If the remote system determines that the caller is not an eligible caller, then the remote system may treat the call as similarly discussed above with respect to how the application on the user's communication device may treat calls from ineligible callers.

Figure 6:
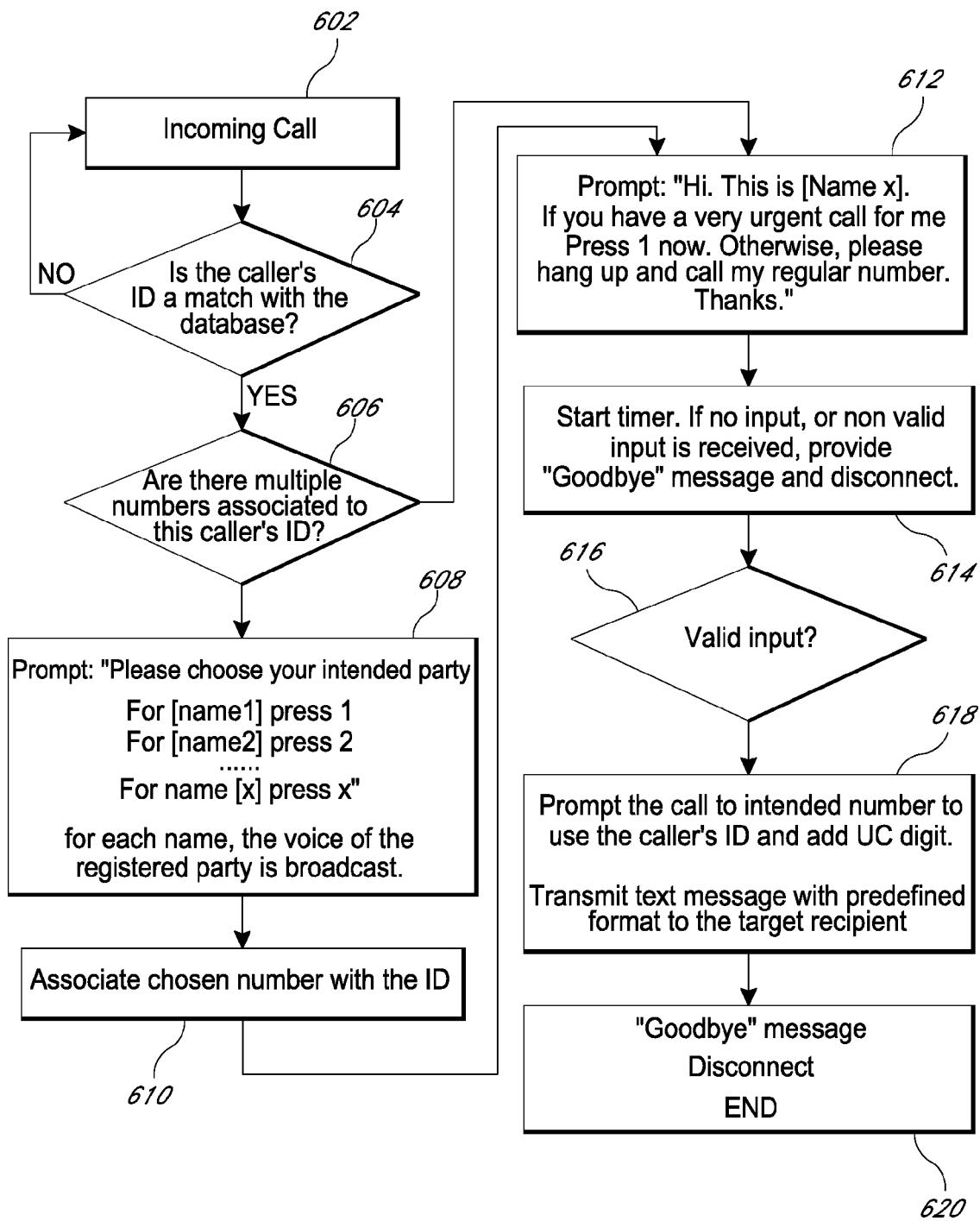

Referring now to FIG. 6, an example process performed by the remote system is illustrated. At state 602, the remote system receives from a caller an incoming call to a number associated with a user that terminates on the remote system. The remote system determines which user the called phone address is associated with my looking up in user account records which user the called phone address is assigned to. Additionally, the remote system determines whether the caller is eligible to provide an urgent call indication. For example, the system determines from the call signaling information or otherwise whether the caller's phone address corresponds to a phone address, stored in the remote system database, that the user had previously indicated is associated with an "eligible" caller.

If the remote system determines that the caller is not eligible, then the call may be handled as similarly discussed above with respect to the user's communication device application. For example, the remote system will not cause the user's communication device to audibly sound to alert the user of the pending call and the call may be answered by the conventional phone carrier answering system or an answering service provided by the remote system. The answering system may play an outgoing message to the calling party asking the calling party to record a message for the user. The message recorded by the calling party may later be played back by the user via the user's phone or otherwise (e.g., via a website associated with the user's carrier or the remote system).

If the caller is determined to be eligible, at state 604, a determination is made as to whether there is more than one person associated with the called number that have the application installed on their communication devices and that have listed the caller as eligible. If the remote system determines that there are multiple people associated with the called number that have the application installed on their communication devices that have designated the caller as "eligible", then the remote system will ask the caller which of the people they are attempting to reach. Optionally, instead, each user is assigned a dedicated phone address so that the system can determine which user the caller is intending to reach from the phone address called by the caller.

The remote system prompts the caller to indicate, via interactive response, which person the caller is trying to reach. At state 610, the indicated person is associated with the caller (e.g., with the caller's caller ID). At 612, a prompt is played to the caller asking the caller to indicate (e.g., via a key press, or voice response, or otherwise) if the caller's call for the indicated person is urgent. The prompt may have been prerecorded by the indicated person (e.g., via the communication device application) and retrieved from a remote system database. At state 614, the remote system starts a timer. If the caller does not provide a response to the prompt (or optionally if the caller's response does not provide a valid response), the system may play a "termination" message to the caller and disconnect the call.

At state 616, a determination is made as to whether the caller indicated the call is urgent. If the caller indicated that the call is urgent, the process proceeds to state 618, and remote system calls the user/person intended by the caller (e.g., at a phone address retrieved from the remote system database), inserts the caller's caller ID information in the call signaling information, and optionally adds an indicator to the calling signaling information (e.g., in the caller ID field). Optionally the remote system plays a voice message indicating that the caller is trying to urgently reach the user. In addition or instead, the remote system transmits a message, such as a text message, using a messaging service, such as SMS or MMS, to the user's communication device. The message can indicate the caller's identity and that the caller has indicated the call is urgent, and may include the caller's phone address. This is done in case the called party may not be in a service area or the telephone is not on. In this case, the moment the telephone is in the service area or is turned back on, the text message will be received and the user can see an urgent call was missed from an eligible caller. At state 620, the remote system plays a termination voice message to the caller and terminates the call with the caller. The indicated person may then call the caller back (e.g., by selecting the caller's phone address in the text message or in the user's call record interface which records the phone addresses of previous callers.

Figure 7:
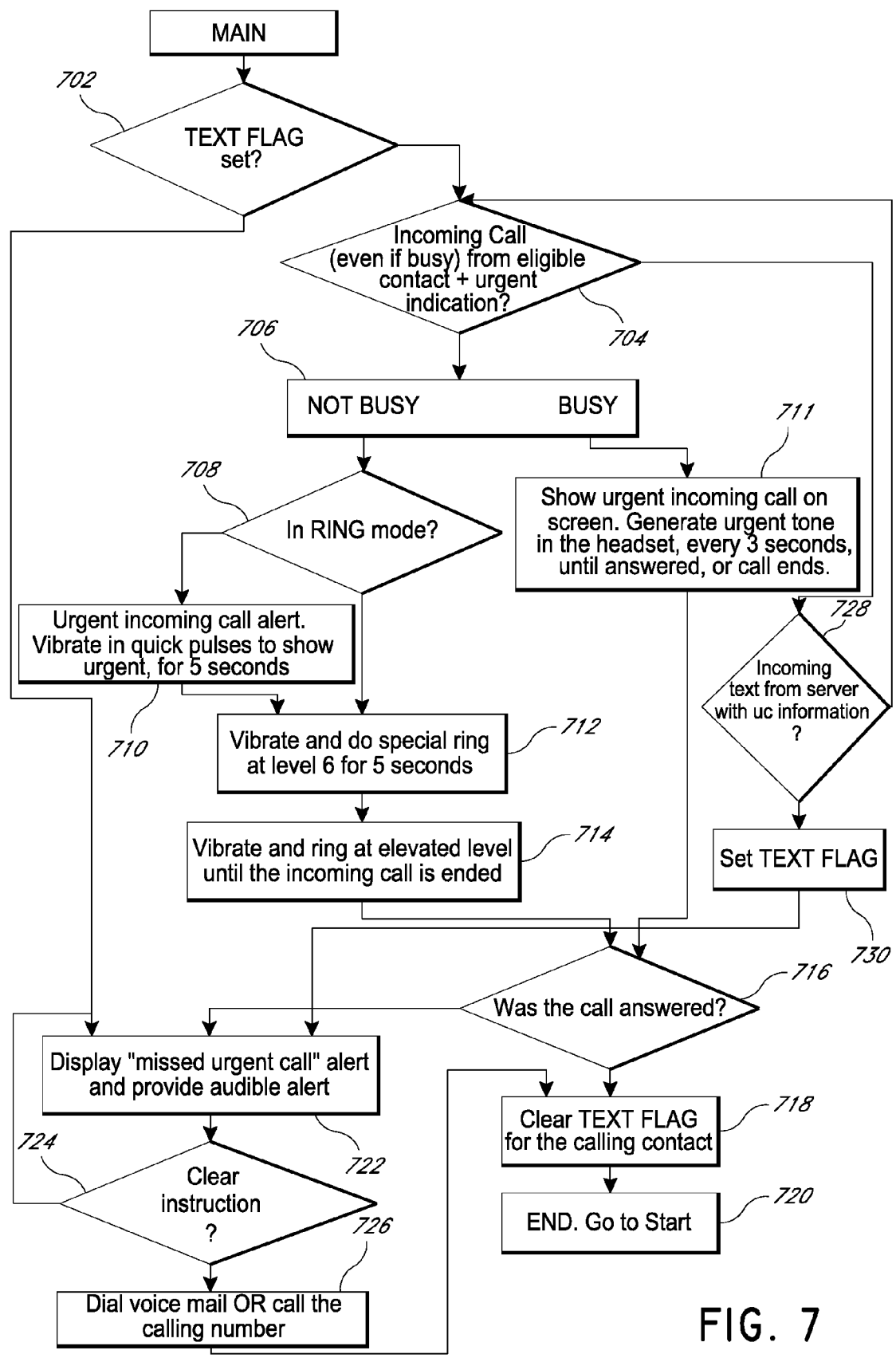

FIG. 7 illustrates an example process performed by the application installed on the user's communication device. This is in case the server is unable to augment the caller's ID with an additional digit. At state 702, a determination is made as to whether a first flag is set. The first flag may be set in memory to indicate that a text message received from the remote system, with a predefined contact which includes an identifier (e.g., the caller ID) of an eligible caller. If it coincides within a certain number of time, then the application can indicate that the incoming call is from the server (which in this case will call the user's communication with the same caller id as the caller's), and the application will respond accordingly. The said flag is useful if the process is interrupted by loss of power to the device.

If the flag is set, the process proceeds to state 704, and a determination is made as to whether the call is from an eligible contact who has indicated that the call is urgent. The foregoing determination may optionally be made even if the user is on another call with the user's communication device.

At state 706, a determination is made as to whether the user communication device is busy on another call. If a busy condition is not present, the process proceeds to state 708, and a determination is made as to whether the communication device is in ring mode. If the device is not in ring mode, the process proceeds to state 710, and the application displays an "urgent call" indication on the user communication device display and optionally vibrates the device for a specified period of time, optionally in a pattern that indicates that the call is urgent. If the device is in ring mode, the process proceeds to state 712, and the application rings the user's communication device (optionally in a special pattern and a first volume, which may be user defined or selection, to indicate an urgent call), optionally displays an "urgent call" indication on the user communication device display, and optionally vibrates the device for a specified period of time, optionally in a pattern that indicates that the call is urgent. The ringing and vibration may be paused after a certain period of time, and may, at state 714 then be repeated until the incoming call is terminated. Thus, the phone may only ring for a predetermined specified period of time or number of rings to indicate the incoming call, and then the service provider may automatically terminate the call leg to the user's phone, and transfers the call to voicemail.

At state 716, a determination is made as to whether the urgent call has been answered. If the call was answered, at state 718, the process clears the text flag for the calling contact, and the process ends at state 720.

If a determination is made at state 716 that the urgent call was not answered, the process proceeds to state 722. At state 722, the application audibly (e.g., if a specific "urgent call missed" tone or tune), visually (e.g., via a "missed urgent call" text message and/or icon), and/or by vibration, indicates, via the user's communication device, that an urgent call has been missed. At state 724 a determination is made as to whether the user had taken an action to clear the "missed urgent call" alert (e.g., pressed a "clear" control or other appropriate icon). At state 726, the application determines whether the user has requested that a voice mail message left by the caller to accessed (e.g., that a voice mail number be dialed to access the caller's voice mail) or whether the user has requested that the caller be called back. The application may then take the corresponding action (e.g., access the voice mail or call the caller). As similarly discussed above, at state 718 the text flag may be cleared, and at state 720, the process may terminate.

If, at state 704, a determination is made that a call (or text) is being received from an eligible contact plus an additional indicative digit, which was added by the server, the program determines that there is an urgent call. If the caller is eligible, at state 728, a determination is made as to whether an urgent call text message has been received from the remote system. If an urgent call text message has been received from the remote system, the system proceeds to state 730, and the text flag is set and the process proceeds to state 722, as similarly discussed above. If an urgent call text message has not been received from the remote system, the system proceeds back to state 704.

Figure 8:
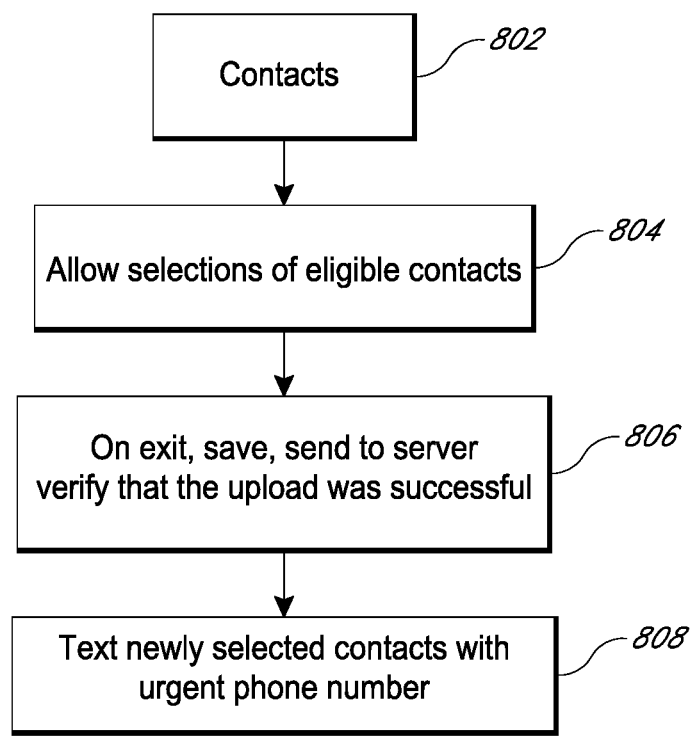

FIG. 8 illustrates an example process for enabling a user to designate eligible contacts, which may be performed in whole or in part using the application discussed above and/or via a website or otherwise. At state 802, the process accesses the user's contacts from a local or remote contacts data store. At state 804, the process causes some or all of the user's contact to be displayed on the user's device in association with a control that enables the user to indicate which contacts are to be designated as eligible. At state 806, the user eligibility designations (and optionally the contact records themselves, including contact phone addresses, such as phone addresses associated with short messaging service or email enabled mobile phones) are uploaded to the remote system. The upload may optionally occur at least partly in response to the user exiting the contact selection interface or the process entirely, or in response to a user activation of an upload/synchronization control.

At state 808, the remote system transmits a message (e.g., a text message via a short text messaging service, an email message, and/or a voice message) to the contacts designated as eligible (e.g., to the phone addresses of the contacts). The message may inform the contacts that the user now has a phone address to be used for urgent calls, and may instruct the contacts to only call the urgent phone address for urgent calls. The message may be configured to appear to come directly from the user (e.g., may be associated with the user's caller ID, and may use language such as "Hi, this is [user name]. I now have an urgent phone number to be used when you are trying to reach me urgently. Please save this phone number). The contacts may store the urgent call phone address in their respective contacts database.

Thus, certain embodiments provide methods and systems for receiving and screening calls, enabling a user to specify which calling parties may bypass a low indication mode, challenging callers, and/or identifying urgent calls.

Unless otherwise indicated, the functions described herein may be performed by software (e.g., including modules) including executable code and instructions running on one or more systems including one or more computers (which may be incorporated within a smart phone). The software may be stored in computer readable media (e.g., some or all of the following: optical media (e.g., CD-ROM, DVD, Blu-ray, etc.), magnetic media (e.g., fixed or removable magnetic media), semiconductor memory (e.g., RAM, ROM, Flash memory, EPROM, etc.), and/or other types of computer readable media.

The one or more computers can include one or more central processing units (CPUs) that execute program code and process data, non-transitory, tangible memory, including, for example, one or more of volatile memory, such as random access memory (RAM) for temporarily storing data and data structures during program execution, non-volatile memory, such as a hard disc drive, optical drive, or FLASH drive, for storing programs and data, including databases, a wired and/or wireless network interface for accessing an intranet and/or Internet, a cellular network, and/or other interfaces.

In addition, the computers can include a display for displaying user interfaces, data, and the like, and one or more user input devices, such as a keyboard, mouse, pointing device, touch screen, microphone and/or the like, used to navigate, provide commands, enter information, provide search queries, and/or the like. The systems described herein can also be implemented using general-purpose computers, special purpose computers, terminals, state machines, and/or hardwired electronic circuits.

While various systems may be described herein, optionally some are or all of the various systems can be included a single system operated by a single operator. While certain user interfaces may be described, other user interfaces may be used.

The example processes described herein do not necessarily have to be performed in the described sequence, and not all states have to be reached or performed. While certain examples have been provided above where specialized call treatment is invoked when the user's phone is in a silent setting, optionally the application may be configured by the user or the application provider to selectively invoke such call treatment operations only when the phone is in a non-indicative state (and not when in a low-indicative state), or only when in a low-indicative state (and not when in a non-indicative state).

Unless the context otherwise indicates, the term "field" with respect to a user interface or form is intended to refer to a user entry mechanism via which the user can input data or commands, such as a text field or a menu via which the user can make a selection, etc. While certain types of example fields may be described (e.g., a checkbox), other types of fields may be used in addition or instead.

Example communications described as being visual may in addition or instead be provided audibly. Communications described as being textual may in addition or instead be provided graphically, and communications described as being graphical may in addition or instead be provided textually.

Various embodiments provide for communications between one or more systems and one or more users. These user communications may be provided to a user terminal (e.g., an interactive television, a phone, a video game system, a laptop/desktop computer, a device providing Internet access, or other networked device). For example, communications may be provided via Webpages, downloaded documents, email, SMS (short messaging service) message, MMS (multimedia messaging service) message, terminal vibrations, other forms of electronic communication text-to-speech message, otherwise.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A method of processing calls, the method comprising:
receiving at a computer system a call from a caller;
determining whether there are multiple users that have designated the caller as eligible to modify a silent setting on respective users' communication devices,
at least partly in response to determining that there are multiple users that designated the caller as eligible to modify the silent setting on respective users' communication devices, prompting the caller to indicate which of the multiple users that the caller is attempting to contact;
receiving a caller selection of a user in the multiple users that designated the caller as eligible to modify the silent setting on respective users' communication devices;
prompting the caller to indicate whether the call is an important call;
determining whether the caller indicated that the call is an important call, and
at least partly in response to determining that the caller indicated that the call is an important call, causing, at least in part, the call to ring through to a communication device of the selected user and providing, in association, an important call indicator to the selected user communication device,
at least partly in response to determining that the caller failed to provide a response to the prompt prompting the caller to indicate whether the call is an important call, terminating the call.

2. The method as defined in claim 1, the method further comprising placing an outcall from the computer system to the communication device of the selected user, and including in call signaling information associated with the outcall the important call indicator, and connecting the call and the outcall to ring the call through to the communication device of the selected user.

3. The method as defined in claim 1, the method further comprising placing an outcall from the computer system to the communication device of the selected user, and including in a caller ID field associated with the outcall the important call indicator, and connecting the call and the outcall to ring the call through to the communication device of the selected user.

4. The method as defined in claim 1, the method further comprising receiving, from a plurality of mobile communication devices, designations of contacts as being eligible to modify silent settings on respective mobile communication devices in the plurality of mobile communication devices.

5. The method as defined in claim 1, wherein the important call indicator is a voice message.

6. A system, comprising:
one or more hardware processors;
a non-transitory computer readable medium storing software modules including instructions that when executed by the one or more hardware processors, cause the system to perform a process, comprising:

receiving at a computer system a call from a caller;

determining whether there are multiple users that have designated the caller as eligible to modify a silent setting on respective users' communication devices, at least partly in response to determining that there are multiple users that designated the caller as eligible to modify the silent setting on respective users' communication devices, prompting the caller to indicate which of the multiple users that the caller is attempting to contact;

receiving a caller selection of a user in the multiple users that designated the caller as eligible to modify the silent setting on respective users' communication devices;

prompting the caller to indicate whether the call is an important call;

determining whether the caller indicated that the call is an important call, and at least partly in response to determining that the caller indicated that the call is an important call, causing, at least in part, the call to ring through to a communication device of the selected user and providing, in association, an important call indicator to the selected user communication device, at least partly in response to determining that the caller failed to provide a response to the prompt prompting the caller to indicate whether the call is an important call, terminating the call.

7. The system as defined in claim 6, the operations further comprising placing an outcall from the computer system to the communication device of the selected user, and including in call signaling information associated with the outcall the important call indicator, and connecting the call and the outcall to ring the call through to the communication device of the selected user.

8. The system as defined in claim 6, the operations further comprising placing an outcall from the computer system to the communication device of the selected user, and including in a caller ID field associated with the outcall the important call indicator, and connecting the call and the outcall to ring the call through to the communication device of the selected user.

9. The system as defined in claim 6, the operations further comprising receiving, from a plurality of mobile communication devices, designations of contacts as being eligible to modify silent settings on respective mobile communication devices in the plurality of mobile communication devices.

10. The system as defined in claim 6, wherein the important call indicator is a voice message.

11. A non-transitory computer readable medium storing instructions that when executed by a system comprising one or more hardware processors, are configured to cause the system to perform operations comprising:

receiving at a computer system a call from a caller;

determining whether there are multiple users that have designated the caller as eligible to modify a silent setting on respective users' communication devices, at least partly in response to determining that there are multiple users that designated the caller as eligible to modify the silent setting on respective users' communication devices, prompting the caller to indicate which of the multiple users that the caller is attempting to contact;

receiving a caller selection of a user in the multiple users that designated the caller as eligible to modify the silent setting on respective users' communication devices;

prompting the caller to indicate whether the call is an important call;

determining whether the caller indicated that the call is an important call, and at least partly in response to determining that the caller indicated that the call is an important call, causing, at least in part, the call to ring through to a communication device of the selected user and providing, in association, an important call indicator to the selected user communication device, at least partly in response to determining that the caller failed to provide a response to the prompt prompting the caller to indicate whether the call is an important call, terminating the call.

12. The computer readable medium as defined in claim 11, the operations further comprising placing an outcall from the computer system to the communication device of the selected user, and including in call signaling information associated with the outcall the important call indicator, and connecting the call and the outcall to ring the call through to the communication device of the selected user.

13. The computer readable medium as defined in claim 11, the operations further comprising placing an outcall from the computer system to the communication device of the selected user, and including in a caller ID field associated with the outcall the important call indicator, and connecting the call and the outcall to ring the call through to the communication device of the selected user.

14. The computer readable medium as defined in claim 11, the operations further comprising receiving, from a plurality of mobile communication devices, designations of contacts as being eligible to modify silent settings on respective mobile communication devices in the plurality of mobile communication devices.

15. The computer readable medium as defined in claim 11, wherein the important call indicator is a voice message.

* * * * *